(12) United States Patent
Kaneshiro

(10) Patent No.: US 10,942,623 B2
(45) Date of Patent: Mar. 9, 2021

(54) INFORMATION PROCESSING APPARATUS, INFORMATION PROCESSING METHOD, AND NON-TRANSITORY COMPUTER READABLE MEDIUM FOR RESUMING AN INTERRUPTED PROCESS

(71) Applicant: FUJI XEROX CO., LTD., Tokyo (JP)

(72) Inventor: Kazushi Kaneshiro, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/509,862

(22) Filed: Jul. 12, 2019

(65) Prior Publication Data

US 2019/0354330 A1    Nov. 21, 2019

Related U.S. Application Data

(62) Division of application No. 15/449,122, filed on Mar. 3, 2017, now abandoned.

(30) Foreign Application Priority Data

Aug. 16, 2016    (JP) .............................. JP2016-159489

(51) Int. Cl.
    *G06F 3/12*         (2006.01)
    *G06Q 30/06*       (2012.01)
    (Continued)

(52) U.S. Cl.
    CPC ........ *G06F 3/04817* (2013.01); *G06F 3/0482* (2013.01); *G06F 3/1204* (2013.01);
    (Continued)

(58) Field of Classification Search
    None
    See application file for complete search history.

(56) References Cited

U.S. PATENT DOCUMENTS

| 5,835,922 A | 11/1998 | Shima et al. |
| 2007/0005861 A1 | 1/2007 | Smith |

(Continued)

FOREIGN PATENT DOCUMENTS

| JP | H07-98708 A | 4/1995 |
| JP | H07-168787 A | 7/1995 |

(Continued)

OTHER PUBLICATIONS

Korean Application Publication 2003061655 (English Translation of Abstract), Jung B H (Year: 2003).*

(Continued)

*Primary Examiner* — Thomas D Lee
(74) *Attorney, Agent, or Firm* — Oliff PLC

(57) ABSTRACT

An information processing apparatus includes a display and a display controller. The display controller controls the display so as to display first information, second information, and third information once processing on a system that cooperates with the information processing apparatus is resumed after the processing has been stopped. The first information indicates a state of a processing screen displayed at the time of the stoppage, the processing screen being used for performing processing related to a document used in the system. The second information specifies the document that is a target of the processing after the processing on the processing screen has been resumed. The third information indicates a screen for the system in which the document is used.

8 Claims, 11 Drawing Sheets

(51) Int. Cl.
  *G06F 3/0481* (2013.01)
  *G06Q 10/10* (2012.01)
  *G06F 3/0482* (2013.01)

(52) U.S. Cl.
  CPC ............ *G06F 3/125* (2013.01); *G06F 3/1272* (2013.01); *G06Q 10/10* (2013.01); *G06Q 30/0635* (2013.01)

(56) References Cited

U.S. PATENT DOCUMENTS

| | | |
|---|---|---|
| 2008/0016170 A1 | 1/2008 | MacKelprang et al. |
| 2008/0098462 A1 | 4/2008 | Carter |
| 2009/0089432 A1 | 4/2009 | Kurozumi |
| 2010/0005475 A1 | 1/2010 | Shirakawa |
| 2011/0098056 A1 | 4/2011 | Rhoads et al. |
| 2014/0304630 A1* | 10/2014 | Choudhary ............ G06F 40/10 715/765 |
| 2015/0077802 A1 | 3/2015 | Tamura |
| 2016/0082504 A1* | 3/2016 | Okochi ................ B22D 17/32 164/150.1 |
| 2016/0117265 A1 | 4/2016 | McKeen et al. |
| 2016/0142569 A1 | 5/2016 | Akuzawa |
| 2016/0261480 A1 | 9/2016 | Agarwal et al. |
| 2016/0307054 A1 | 10/2016 | Takemura et al. |
| 2016/0328634 A1 | 11/2016 | Hirose |
| 2017/0013147 A1 | 1/2017 | Umezawa et al. |
| 2017/0046024 A1 | 2/2017 | Dascola et al. |
| 2017/0054658 A1 | 2/2017 | Min et al. |

FOREIGN PATENT DOCUMENTS

| | | |
|---|---|---|
| JP | H09-152925 A | 6/1997 |
| JP | 2004-287999 A | 10/2004 |
| KR | 20030061655 A * | 7/2003 |

OTHER PUBLICATIONS

Mar. 17, 2020 Office Action issued in Japanese Patent Application No. 2016-159489.

* cited by examiner

FIG. 7

| DOCUMENT ID | BUSINESS SYSTEM ID | STORING LOCATION INFORMATION | DISPLAY POSITION INFORMATION |
|---|---|---|---|
| B001 | G001 | /user folder/order reception/ company α | X: 1000 Y: 1500 |
| B002 | G001 | /user folder/order reception/ company β | X: 1000 Y: 2500 |

FIG. 8

| DOCUMENT-SCREEN INFORMATION ID | BUSINESS SYSTEM ID | BUSINESS SYSTEM URL | DOCUMENT-PORTION INFORMATION |
|---|---|---|---|
| INFORMATION 1 | G001 | https://xx.yy.zz/ inputorder | //form/input[@id= "uploadorderform" ] |
| ... | ... | ... | ... |

```
...
<form>
 <input type="file" id="uploadorderform">
 </input>
</form>
...
```
H1

| ASSOCIATION ID | DOCUMENT ID | DOCUMENT-SCREEN INFORMATION ID |
|---|---|---|
| ASSOCIATION 1 | B001 | INFORMATION 1 |
| ... | ... | ... |

INFORMATION PROCESSING APPARATUS, INFORMATION PROCESSING METHOD, AND NON-TRANSITORY COMPUTER READABLE MEDIUM FOR RESUMING AN INTERRUPTED PROCESS

CROSS-REFERENCE TO RELATED APPLICATIONS

This application is a divisional of U.S. application Ser. No. 15/449,122 filed Mar. 3, 2017, which is based on and claims priority under 35 USC 119 from Japanese Patent Application No. 2016-159489 filed Aug. 16, 2016.

BACKGROUND

(i) Technical Field

The present invention relates to an information processing apparatus, an information processing method, and a non-transitory computer readable medium.

(ii) Related Art

When a system is used, various documents are used in order to transfer necessary information between users or to record necessary information, for example.

SUMMARY

According to an aspect of the invention, there is provided an information processing apparatus including a display and a display controller. The display controller controls the display so as to display first information, second information, and third information once processing on a system that cooperates with the information processing apparatus is resumed after the processing has been stopped. The first information indicates a state of a processing screen displayed at the time of the stoppage, the processing screen being used for performing processing related to a document used in the system. The second information specifies the document that is a target of the processing after the processing on the processing screen has been resumed. The third information indicates a screen for the system in which the document is used.

BRIEF DESCRIPTION OF THE DRAWINGS

An exemplary embodiment of the present invention will be described in detail based on the following figures, wherein:

FIG. 7 illustrates an example of document-related information that is stored;

FIG. 8 illustrates an example of document-screen information that is stored;

DETAILED DESCRIPTION

1. Exemplary Embodiment

Figure 1:
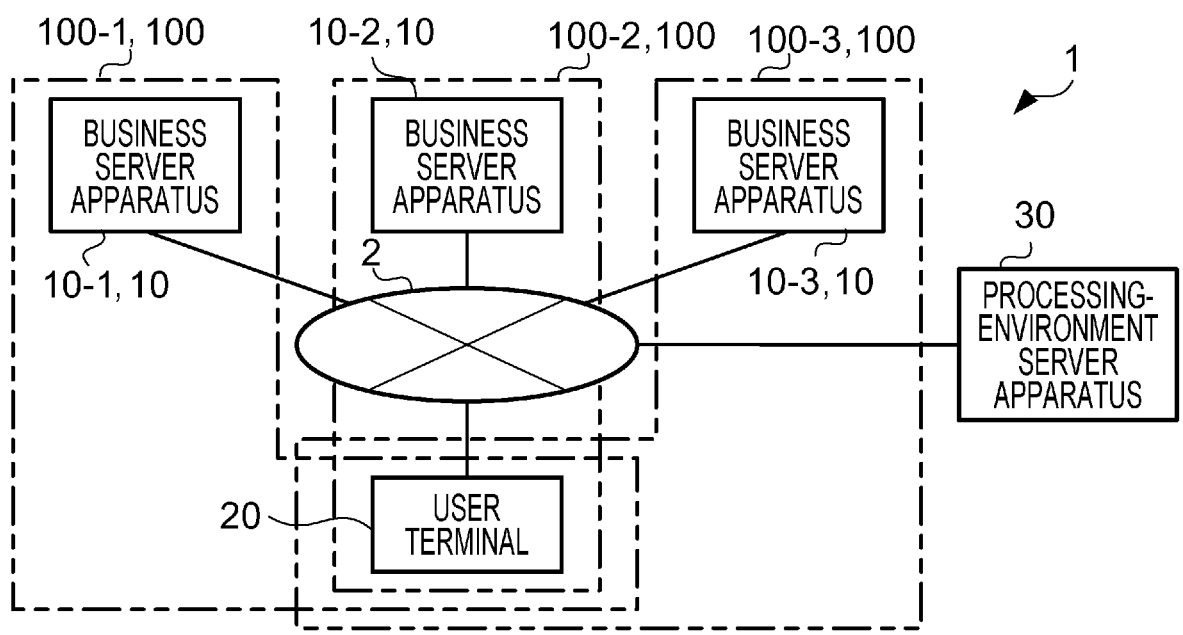
FIG. 1 illustrates the entire configuration of an information processing system according to the exemplary embodiment.

FIG. 1 illustrates the entire configuration of an information processing system 1 according to the exemplary embodiment. The information processing system 1 includes a communication network 2, business server apparatuses 10-1, 10-2, and 10-3 (any of which is referred to as a "business server apparatus 10" unless distinguishing a specific one), a user terminal apparatus 20, and a processing-environment server apparatus 30.

The communication network 2 includes a mobile communication network, the Internet, and the like and intermediates data communication between the apparatuses. Each of the apparatuses included in the information processing system 1 is connected to the communication network 2 with a wire (or may be connected wirelessly). The business server apparatus 10 is an information processing apparatus that provides functions related to business (e.g., financial affairs, human affairs, salaries, purchases, selling, and production) that is conducted in a company or the like.

The user terminal apparatus 20 is an information processing apparatus operated by a user in order to perform processing using the functions provided by the business server apparatus 10. In this manner, each business server apparatus 10 and the user terminal apparatus 20 cooperate with each other and realize business systems 100-1, 100-2, and 100-3 (any of which is referred to as a "business system 100" unless distinguishing a specific one). The user terminal apparatus 20 displays a processing screen for performing processing related to the business system 100 and a system screen that is a screen for the business system 100, thereby providing the user with a processing environment for performing the processing.

The processing-environment server apparatus 30 is an information processing apparatus that generates and transmits processing-environment data indicating the processing environment provided by the user terminal apparatus 20. The processing-environment server apparatus 30 generates the processing-environment data when, for example, the user stops the processing, and transmits the processing-environment data to the user terminal apparatus 20 when the user resumes the processing. By using the transmitted processing-environment data, the user terminal apparatus 20 provides the user with the processing environment indicated by the processing-environment data. Details of the processing environment and the processing-environment data will be described later.

Figure 2:
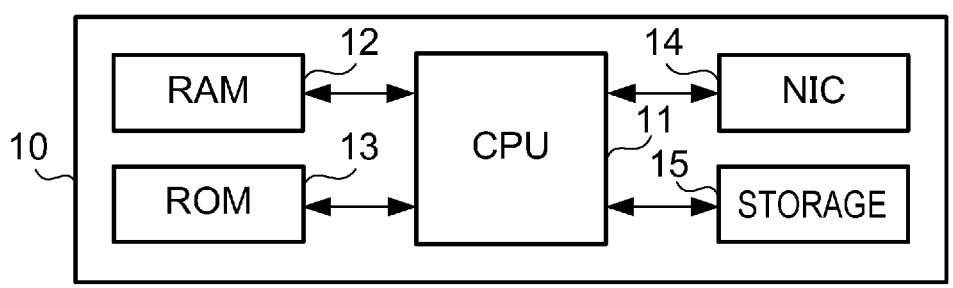
FIG. 2 illustrates a hardware configuration of a business server apparatus.

FIG. 2 illustrates a hardware configuration of the business server apparatus 10. The business server apparatus 10 is a computer including a central processing unit (CPU) 11, a random access memory (RAM) 12, a read only memory (ROM) 13, a network interface card (NIC) 14, and a storage 15.

The CPU 11 controls an operation of each unit by using the RAM 12 as a work area and by executing a program stored in the ROM 13 or the storage 15. The NIC 14 includes a communication circuit that performs mobile wireless communication and performs communication with external apparatuses via the communication network 2. The storage 15 is a storing unit such as a hard disk drive (HDD), a solid state drive (SSD), or a flash memory and stores data and programs used by the CPU 11 to perform control.

Figure 3:
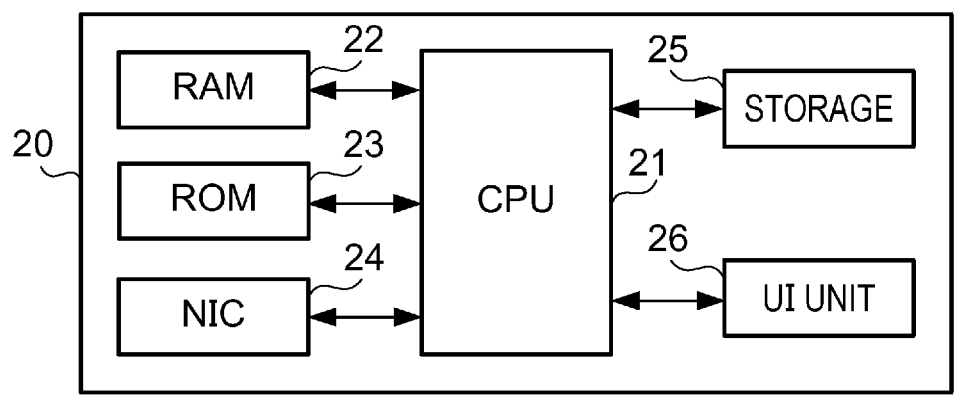
FIG. 3 illustrates a hardware configuration of a user terminal apparatus.

FIG. 3 illustrates a hardware configuration of the user terminal apparatus 20. The user terminal apparatus 20 is a computer including a CPU 21, a RAM 22, a ROM 23, an NIC 24, a storage 25, and a user interface (UI) unit 26. The CPU 21, the RAM 22, the ROM 23, the NIC 24, and the storage 25 are hardware components that are respectively the same or substantially the same as the CPU 11, the RAM 12, the ROM 13, the NIC 14, and the storage 15 illustrated in FIG. 2. The UI unit 26 includes a liquid crystal display and displays, for example, a menu screen for operating the user terminal apparatus 20. The UI unit 26 further includes input devices such as a keyboard and a mouse.

Figure 4:
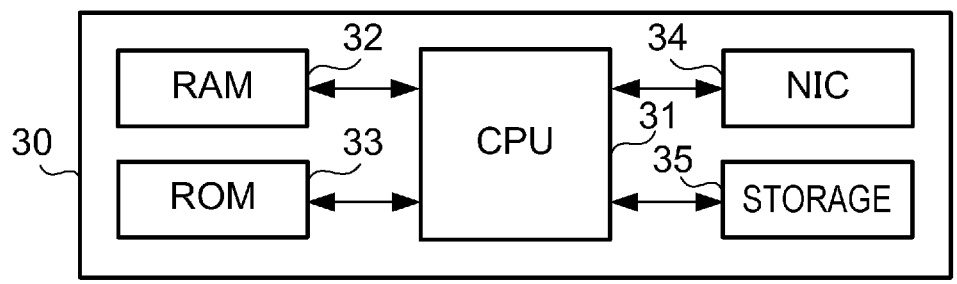
FIG. 4 illustrates a hardware configuration of a processing-environment server apparatus.

FIG. 4 illustrates a hardware configuration of the processing-environment server apparatus 30. The processing-environment server apparatus 30 is a computer including a CPU 31, a RAM 32, a ROM 33, an NIC 34, and a storage 35. The CPU 31, the RAM 32, the ROM 33, the NIC 34, and the storage 35 are hardware components that are respectively the same or substantially the same as the CPU 11, the RAM 12, the ROM 13, the NIC 14, and the storage 15 illustrated in FIG. 2.

The CPU of each apparatus included in the information processing system 1 executes a program and controls the corresponding units, and thereby realizes the following functions.

Figure 5:
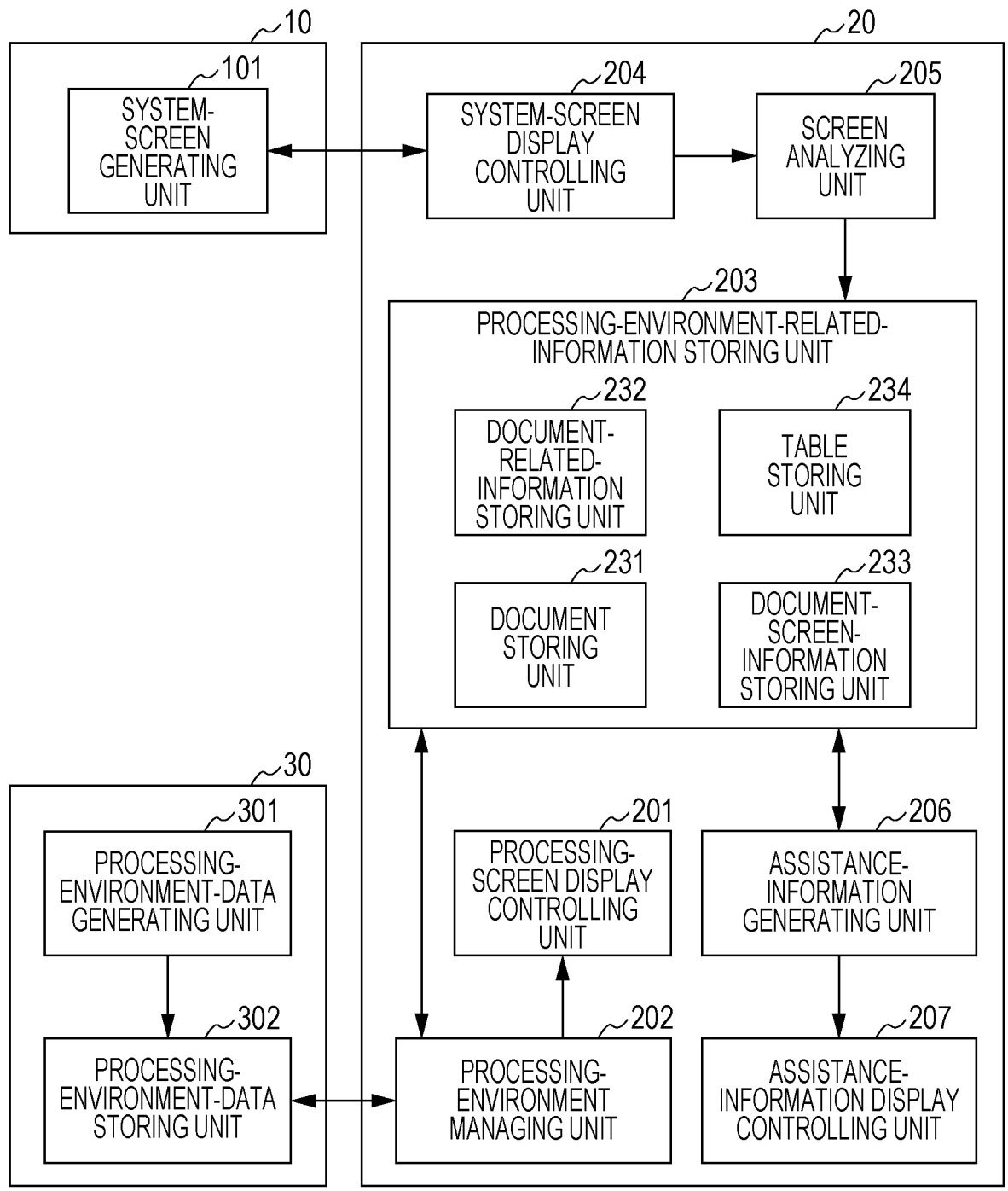
FIG. 5 illustrates a functional configuration realized by the information processing system.

FIG. 5 illustrates a functional configuration realized by the information processing system 1. The business server apparatus 10 includes a system-screen generating unit 101. The user terminal apparatus 20 includes a processing-screen display controlling unit 201, a processing-environment managing unit 202, a processing-environment-related-information storing unit 203, a system-screen display controlling unit 204, a screen analyzing unit 205, an assistance-information generating unit 206, and an assistance-information display controlling unit 207. The processing-environment server apparatus 30 includes a processing-environment-data generating unit 301 and a processing-environment-data storing unit 302.

The processing-screen display controlling unit 201 of the user terminal apparatus 20 controls the UI unit 26, which is a display of the user terminal apparatus 20, so as to display the above-described processing screen, that is, a screen for performing processing related to the business system 100. In addition, the system-screen display controlling unit 204 controls the UI unit 26, which is the display of the user terminal apparatus 20, so as to display the system screen provided by the business system 100. In the exemplary embodiment, the system-screen generating unit 101 of the business server apparatus 10 generates a web page specified in a HyperText Markup Language (HTML) document as the system screen and transmits information of the web page to the user terminal apparatus 20, and then the system-screen display controlling unit 204 causes the system screen to be displayed by using a browser function.

Figure 6:
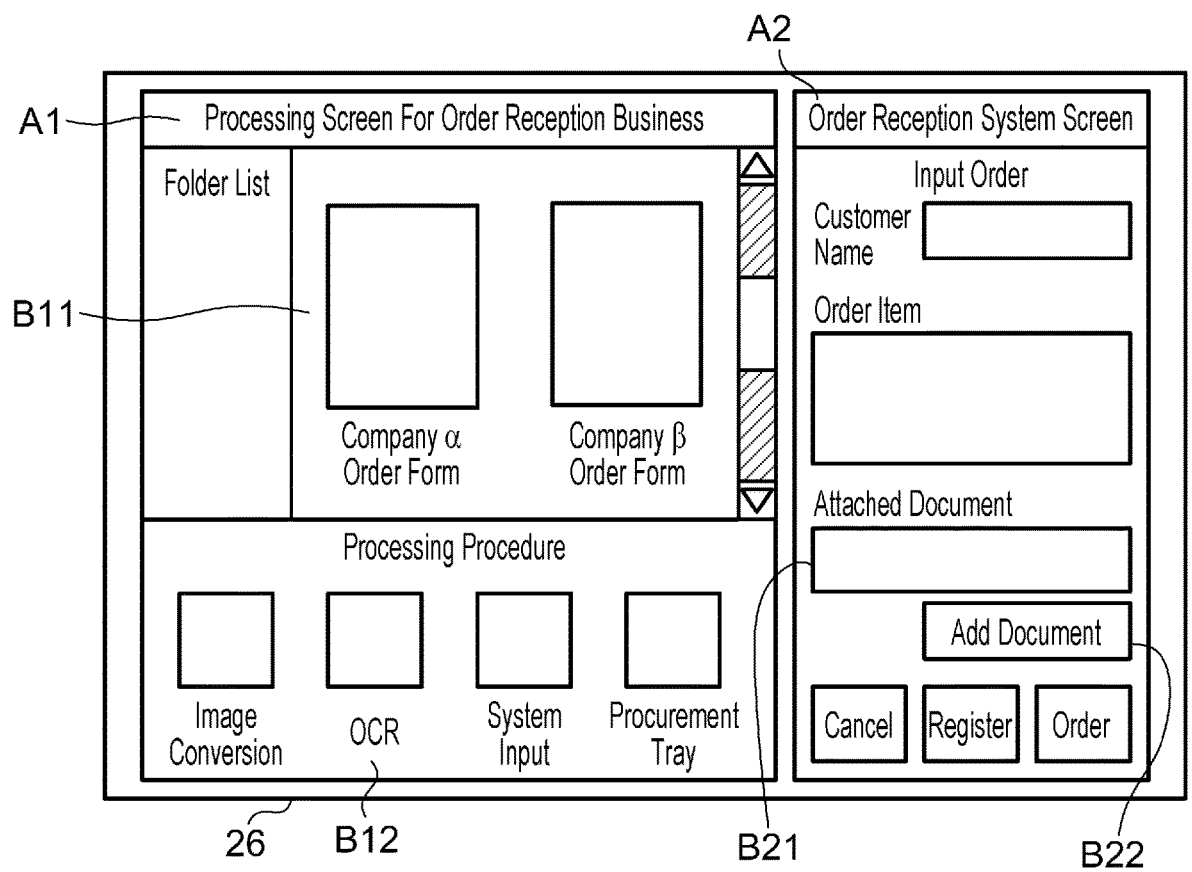
FIG. 6 illustrates an example of a processing screen and an example of a system screen that are displayed.

FIG. 6 illustrates an example of the processing screen and an example of the system screen that are displayed. In the examples in FIG. 6, the processing-screen display controlling unit 201 causes a processing screen A1 for order reception business to be displayed, and the system-screen display controlling unit 204 causes a system screen A2 for an order reception system to be displayed. The processing screen A1 includes a document displaying portion B11 that displays documents used in the order reception business and a processing procedure portion B12 that illustrates a processing procedure for the order reception business. In the document displaying portion B11, document images representing documents named "Company α Order Form" and "Company β Order Form" are displayed.

In the processing procedure portion B12, processing icons representing processing of "Image Conversion", "OCR (Optical Character Recognition)", "System Input", and "Procurement Tray" are displayed. Each of the processing icons is associated with processes for performing the corresponding processing, and in response to selection of a processing icon, the processes associated with the processing icon are expected to be performed. For example, in response to the user's selection of the "Image Conversion" processing icon, as processes for "Image Conversion", for example, a process of starting an image conversion program, an image reading process, and an image conversion process are performed.

The system screen A2 is displayed in response to the selection of the "System Input" processing icon. The system screen A2 includes an attached document box B21 that is a region for displaying an attached document and a document addition button B22 for adding a document to the attached document box B21. By performing processing with the processing screen A1 and the system screen A2 displayed, the user executes order reception business for receiving an order from a customer.

The processing-screen display controlling unit 201 causes the processing screen to be displayed on the basis of the above-described processing-environment data, that is, data indicating the processing environment provided by the user terminal apparatus 20. The processing-environment data indicates document specifying information for specifying a document used for processing, processing procedure information indicating a processing procedure, a business system identification (ID) assigned to the business system 100 in which the document is used, and the like. The processing procedure information includes image information representing the processing icons, parameter information for performing the processes corresponding to the processing icons, and the like.

The processing-environment-data generating unit 301 of the processing-environment server apparatus 30 generates, for each business system 100, processing-environment data indicating the processing environment for performing processing related to the business system 100. The processing-environment-data generating unit 301 supplies the generated processing-environment data to the processing-environment-data storing unit 302. The processing-environment-data storing unit 302 stores the processing-environment data generated by the processing-environment-data generating unit 301.

The processing-environment managing unit 202 manages the processing environment that is provided when processing related to the business system 100 is performed. Upon the user starting processing for a certain business, the processing-environment managing unit 202, for example, requests the processing-environment server apparatus 30 for processing-environment data corresponding to the processing. In response to the request for the processing-environment data from the user terminal apparatus 20, the processing-environment-data storing unit 302 of the processing-environment server apparatus 30 transmits the requested processing-environment data to the user terminal apparatus 20 from which the request has been transmitted. The processing-environment managing unit 202 supplies the thus obtained processing-environment data to the processing-screen display controlling unit 201.

The processing-environment-related-information storing unit 203 stores various information items related to the processing environment. The processing-environment-related-information storing unit 203 includes a document storing unit 231, a document-related-information storing unit 232, a document-screen-information storing unit 233, and a table storing unit 234. The document storing unit 231 stores a document used in the business system 100. The document-related-information storing unit 232 stores document-related information that is related to a document displayed on the processing screen.

FIG. 7 illustrates an example of the document-related information that is stored. In the example in FIG. 7, the document-related-information storing unit 232 stores a document ID that is document specifying information for specifying a document, a business system ID assigned to the business system 100 in which the document is used, storing location information indicating the location where the file of the document is stored, and display position information indicating the position (coordinates in a coordinate system having the upper-left corner of the processing screen as the origin) at which the document is being displayed on the processing screen.

For example, document-related information of a document ("Company α Order Form" illustrated in FIG. 6) that is stored in a folder "/user folder/order reception/company α", that is being displayed at coordinates "X: 1000, Y: 1500", and that has a document ID "B001" used in the business system 100 having a business system ID "G001" is stored. In addition, document-related information of a document ("Company β Order Form" illustrated in FIG. 6) that is stored in a folder "/user folder/order reception/company β", that is being displayed at coordinates "X: 1000, Y: 2500", and that has a document ID "B002" used in the business system 100 having the business system ID "G001" is stored.

The document-screen-information storing unit 233 stores document-screen information related to the system screen on which an operation related to the document used in the business system 100 is performed.

FIG. 8 illustrates an example of the document-screen information that is stored. In the example in FIG. 8, the document-screen-information storing unit 233 stores an document-screen information ID assigned to each document-screen information item, a business system ID assigned to the business system 100 that provides the system screen, a uniform resource locator (URL) of the business system 100, and document-portion information indicating the portion corresponding to the document, which is a processing target, in the HTML document specifying the system screen for the business system 100. The portion corresponding to the document refers to a portion in which the document is displayed or an operation with respect to the document is received.

In the example in FIG. 8, a document-screen information ID "information 1" is associated with a business system ID "G001", an URL "https://xx.yy.zz/inputorder" of the business system 100, and document-portion information "//form/input[@id="uploadorderform"]". The document-portion information indicates specification of the portion corresponding to the document, which is the processing target, in the HTML document specifying the system screen.

Figures 9, 10, 11:
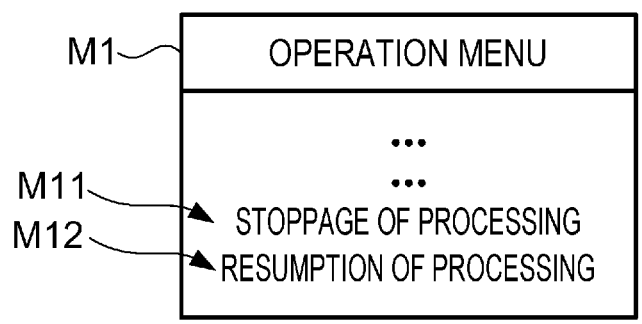
FIG. 9 illustrates an example of a HyperText Markup Language (HTML) document specifying the system screen.
FIG. 10 illustrates an example of a document table.
FIG. 11 illustrates an example of an operation menu that is displayed.

FIG. 9 illustrates an example of an HTML document specifying the system screen. FIG. 9 illustrates an example of an HTML document H1 including a <form> tag for transmitting a document to an external apparatus and an <input> tag for selecting the document to be transmitted. These tags are specifications for receiving operations for selecting and transmitting a document to the business server apparatus 10, and the document-portion information illustrated in FIG. 8 indicates these tags.

The screen analyzing unit 205 analyzes the system screen provided by the business system 100 to generate the above-described document-portion information. The system-screen display controlling unit 204 causes the system screen to be displayed and supplies the HTML document specifying the system screen to the screen analyzing unit 205 together with the business system ID and URL of the business system 100 that has provided the system screen. The screen analyzing unit 205 analyzes the supplied HTML document to specify the portion corresponding to the document and generates information indicating the specified portion as the document-portion information.

The screen analyzing unit 205 specifies the portion corresponding to the document from, for example, the file name of the document stored in the document storing unit 231 (e.g., if the file name of the document includes a character string "orderform", then the screen analyzing unit 205 specifies, as the portion corresponding to the document, a portion indicated by a tag including a character string "uploadorderform" illustrated in FIG. 9. The screen analyzing unit 205 supplies the generated document-portion information to the document-screen-information storing unit 233 together with the supplied business ID and URL. The document-screen-information storing unit 233 assigns a document-screen information ID to the supplied document-portion information and stores the document-portion information in association with the document-screen information ID and the supplied business system ID and URL.

The table storing unit 234 stores a document table in which the document-related information stored in the document-related-information storing unit 232 and the document-screen information stored in the document-screen-information storing unit 233 are associated with each other.

FIG. 10 illustrates an example of the document table. In the example in FIG. 10, an association ID "association 1" is associated with a document ID "B001" and a document-screen information ID "information 1".

In the exemplary embodiment, if document-related processing related to the document used in the business system 100 is stopped, the assistance-information generating unit 206 generates assistance information that assists resumption of processing in the processing environment that is currently provided. The document-related processing is stopped upon receiving a predetermined stoppage operation. In the exemplary embodiment, the stoppage operation is performed from, for example, an operation menu that is displayed through a specific operation (e.g., right click) on the processing screen A1 or the system screen A2 illustrated in FIG. 6.

FIG. 11 illustrates an example of the operation menu that is displayed. In the example in FIG. 11, an operation menu M1 is displayed, and the operation menu M1 includes a processing-stoppage icon M11 indicating "stoppage of processing" and a processing-resumption icon M12 indicating "resumption of the processing". If the processing-stoppage icon M11 is selected, the assistance-information generating unit 206 determines that the document-related processing is to be stopped and generates the following four information items for assisting the resumption of processing (hereinafter referred to as "assistance information").

The assistance-information generating unit 206 generates, as first assistance information, information indicating the state of the processing screen displayed at the time of the stoppage, the processing screen being used for performing document-related processing. The first assistance information is an example of "first information" according to the exemplary embodiment of the present invention. The assistance-information generating unit 206 also generates, as second assistance information, information specifying a document that is the target of the processing after the processing on the processing screen has been resumed. The second assistance information is an example of "second information" according to the exemplary embodiment of the present invention.

The assistance-information generating unit 206 also generates, as third assistance information, information indicating a system screen for the business system 100 in which the document is used. The third assistance information is an example of "third information" according to the exemplary embodiment of the present invention. The assistance-information generating unit 206 also generates, as fourth assistance information, information indicating a portion corresponding to the document on the system screen indicated by the third assistance information. The fourth assistance information is an example of "fourth information" according to the exemplary embodiment of the present invention. The assistance-information generating unit 206 stores each assistance information item generated in the above manner.

If the processing-stoppage icon M11 is selected, the processing-environment managing unit 202 also determines that the document-related processing is to be stopped and generates the processing-environment data indicating the current processing environment (data including the document specifying information, the processing procedure information, the business system ID, and the like). The processing-environment managing unit 202 transmits the generated processing-environment data to the processing-environment server apparatus 30. The processing-environment-data storing unit 302 of the processing-environment server apparatus 30 stores the transmitted processing-environment data as the processing-environment data indicating the processing environment provided at the time of the stoppage of the processing.

Note that in the exemplary embodiment, for example, an operation for closing the processing screen A1 illustrated in FIG. 6, that is, an operation for stopping the program for executing the processing-screen display controlling unit 201 that causes the processing screen A1 to be displayed, may also be received as the stoppage operation. In this case, the assistance-information generating unit 206 generates the assistance information, and the processing-environment managing unit 202 generates the processing-environment data indicating the current processing environment. In contrast, an operation for closing the system screen A2 (e.g., an operation for stopping the browser displaying the system screen A2) is not received as the stoppage operation. In this case, merely the displaying of the system screen A2 is stopped, and the processing screen A1 remains displayed. Accordingly, neither the processing-environment data nor the assistance information is generated.

In the above manner, the stoppage of the document-related processing refers to temporarily stopping the provision of the processing environment that has been provided to the user, in which condition the processing-environment data indicating the processing environment is necessary to provide the processing environment again. Therefore, at the time of the stoppage of the document-related processing, the processing-environment managing unit 202 generates the processing-environment data indicating the current processing environment. In addition, the resumption of the document-related processing refers to switching from the state in which the processing environment is not provided to the user to the state in which the processing environment is provided again and is, specifically, displaying the processing screen displayed at the time of the stoppage by the processing-environment managing unit 202 on the basis of the generated processing-environment data.

Once the processing on the business system 100 is resumed after having been stopped, the assistance-information display controlling unit 207 controls the display of the user terminal apparatus 20 so as to display the first assistance information, second assistance information, third assistance information, and fourth assistance information generated by the assistance-information generating unit 206. The assistance-information display controlling unit 207 is an example of a "display controller" according to the exemplary embodiment of the present invention. The user terminal apparatus 20 including the assistance-information display controlling unit 207 is an example of the "information processing apparatus" according to the exemplary embodiment of the present invention.

If the processing-resumption icon M12 indicating the resumption of the processing is selected from the operation menu M1 illustrated in FIG. 11, in the exemplary embodiment, the assistance-information display controlling unit 207 determines that the processing that has been stopped is resumed. Upon determining the resumption of the processing, the assistance-information display controlling unit 207 reads the first, second, third, and fourth assistance information stored in the assistance-information generating unit 206 and causes the display to display the assistance information.

Figure 12A:
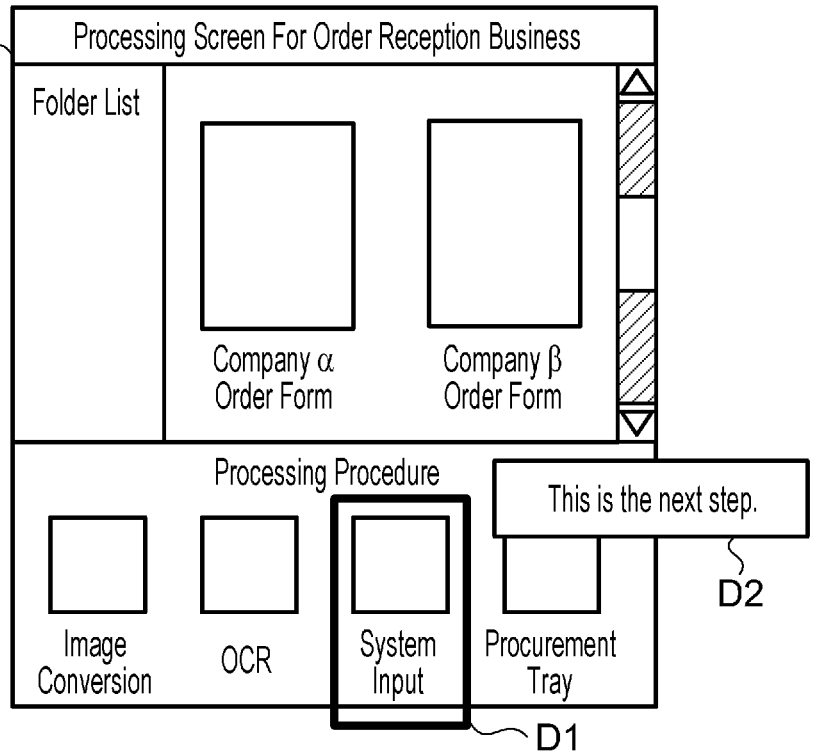
FIG. 12A illustrates an example of assistance information that is displayed.
Figure 12B:
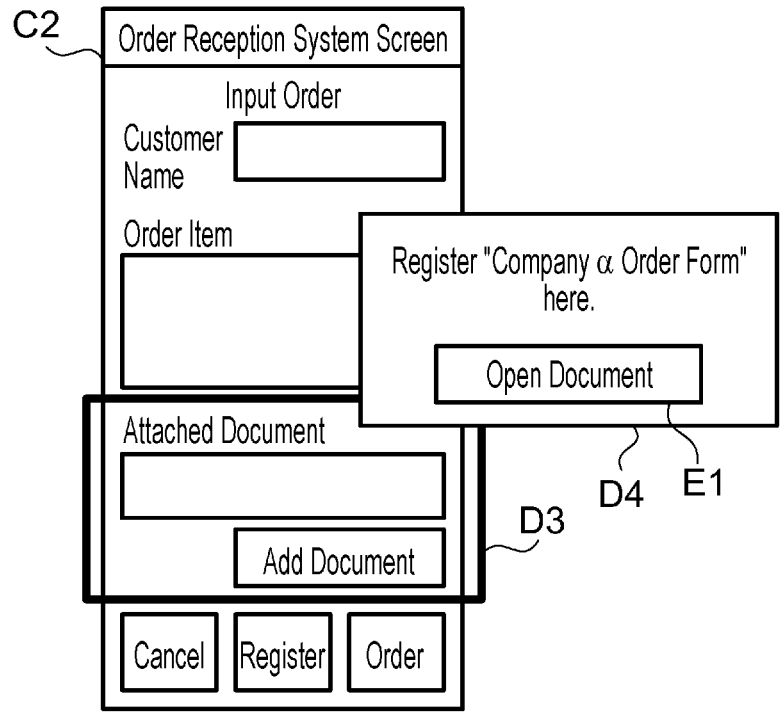
FIG. 12B illustrates an example of assistance information that is displayed.
Figure 12C:
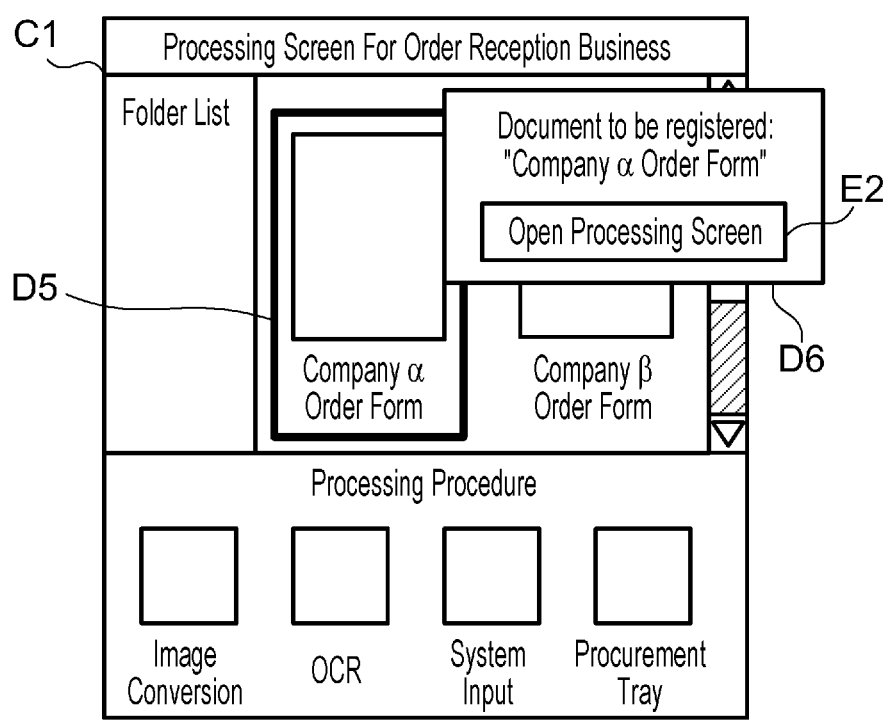
FIG. 12C illustrates an example of assistance information that is displayed.

FIGS. 12A, 12B, and 12C each illustrate an example of the assistance information that is displayed. In the example in FIG. 12A, the assistance-information display controlling unit 207 causes a captured image C1, a guidance image D1, and a guidance image D2 to be displayed. The captured image C1 is obtained by capturing the processing screen A1 illustrated in FIG. 6. The guidance image D1 is a frame image defining the "System Input" processing icon that is to be initially selected once the processing is resumed. The guidance image D2 indicates an instruction for performing processing, saying "This is the next step.", which is superposed on the guidance image D1.

The captured image C1 is an image representing the processing screen A1 that was being displayed at the time of the stoppage of the processing. The guidance image D1 and the guidance image D2 are information for guiding the user to perform processing that is supposed to be performed in the processing environment in which the processing screen A1 is displayed. Thus, the captured image C1, the guidance image D1, and the guidance image D2 are information indicating the state of the processing screen displayed at the time of the stoppage, the processing screen being used for performing the document-related processing, that is, the first assistance information. The assistance-information generating unit 206 that generates the captured image C1 is an example of a "generating unit" according to the exemplary embodiment of the present invention.

In the example in FIG. 12B, the assistance-information display controlling unit 207 causes a captured image C2, a guidance image D3, and a guidance image D4 to be displayed. The captured image C2 is obtained by capturing the system screen A2 illustrated in FIG. 6. The guidance image D3 is a frame image defining the attached document box B21 (a region for displaying the attached document) on the system screen A2. The guidance image D4 indicates an instruction for performing processing, saying "Register "Company α Order Form" here.", which is superposed on the guidance image D3. The captured image C2 is the third assistance information indicating a screen for the business system 100 in which the document "Company α Order Form" is used.

The assistance-information display controlling unit 207 causes the guidance image D3 to be displayed as information indicating a portion corresponding to the document on the system screen A2 represented by the captured image C2. In addition, the assistance-information display controlling unit 207 causes the guidance image D4 to be displayed as information for guiding the user to perform processing that is supposed to be performed in the portion defined by the guidance image D3. The guidance image D3 and the guidance image D4 are the fourth assistance information indicating the portion corresponding to the document, which is the target of the processing, on the system screen A2 indicated by the third assistance information.

The document "Company α Order Form", which is the target of the processing according to the guidance of the guidance image D4, is also a document specified by the above-described second assistance information (information specifying the document that is the target of the processing after the processing on the processing screen has been resumed). The guidance image D4 includes a display button E1 for displaying the document "Company α Order Form". Upon receiving a pushing operation of the display button E1, a program for displaying the document "Company α Order Form" is started, and this document is displayed. Thus, the assistance-information display controlling unit 207 causes an image (the display button E1 in this example) to be displayed, the image being used for receiving an operation for displaying the document specified by the second assistance information.

In the example in FIG. 12C, the assistance-information display controlling unit 207 causes the captured image C1 (the image obtained by capturing the processing screen A1 illustrated in FIG. 6), a guidance image D5, and a guidance image D6 to be displayed. The guidance image D5 is a frame image defining a document that is the target of the processing on the system screen A2 represented by the captured image C2. The guidance image D6 indicates that the target of the processing is the document defined by the guidance image D5 by displaying the character string "Document to be registered: "Company α Order Form"". The captured image C1, the guidance image D5, and the guidance image D6 indicate information for specifying the document that is the target of the processing after the processing on the processing screen A1 has been resumed, that is, the second assistance information.

The guidance image D6 includes a display button E2 for displaying the processing screen A1 represented by the captured image C1. Upon receiving a pushing operation of the display button E2, the processing-screen display controlling unit 201 obtains the processing-environment data that was stored, at the time of the stoppage of the processing, in the processing-environment-data storing unit 302 of the processing-environment server apparatus 30 and causes the processing screen A1 to be displayed on the basis of the obtained processing-environment data. In this manner, the assistance-information display controlling unit 207 causes an image (the display button E2 in the above example) to be displayed, the image being used for receiving an operation for displaying the processing screen A1 displayed at the time of the stoppage as indicated by the first assistance information.

Figure 13:
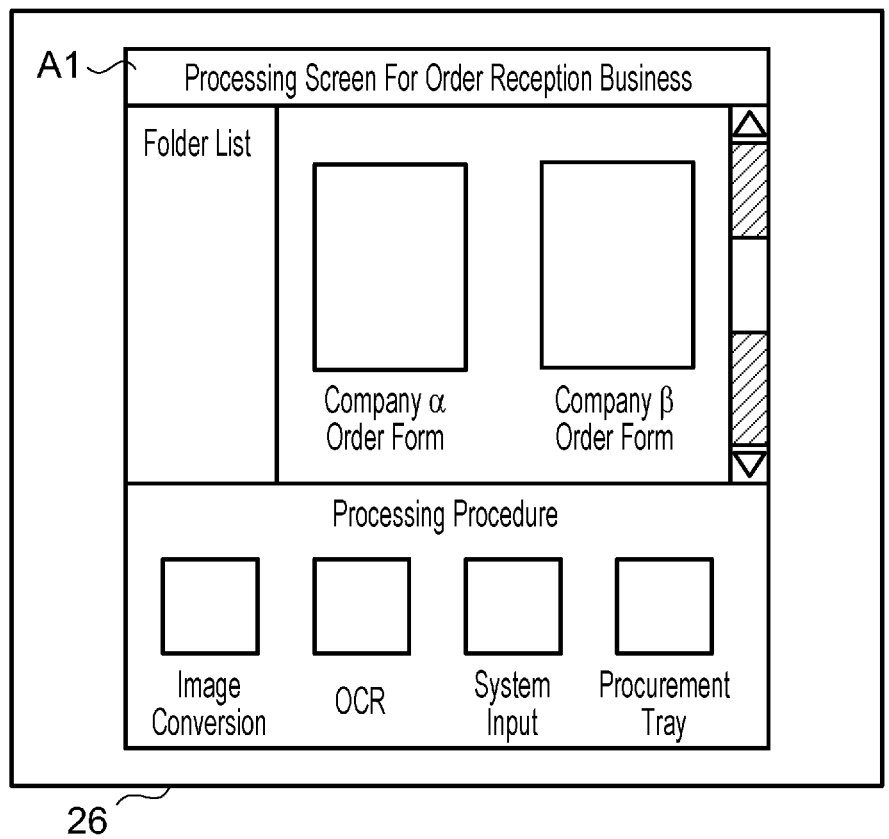
FIG. 13 illustrates an example of the processing screen displayed in response to an operation on the display button.

FIG. 13 illustrates an example of the processing screen displayed in response to the selection of the display button E2. In the example in FIG. 13, the processing-screen display controlling unit 201 causes the UI unit 26 of the user terminal apparatus 20 to display the processing screen A1. By referring to the first, second, third, and fourth assistance information that has already been displayed, the user selects the "System Input" processing icon and adds the document "Company α Order Form" to the attached document box B21 on the system screen A2.

Even in the state where the processing screen A1 illustrated in FIG. 13 is displayed, each image (the first, second, third, and fourth assistance information) illustrated in FIG. 12A, FIG. 12B, and FIG. 12C is kept displayed by the assistance-information display controlling unit 207. By switching the foremost image among the displayed images (e.g., switching the active screen on the task bar or pushing the tab key), the user performs processing on the actual processing screen and system screen while checking the document that is supposed to be processes and the processing icon.

The user terminal apparatus 20 and the processing-environment server apparatus 30 perform a process for stopping processing and a process for resuming the processing by using the above configurations.

Figure 14:
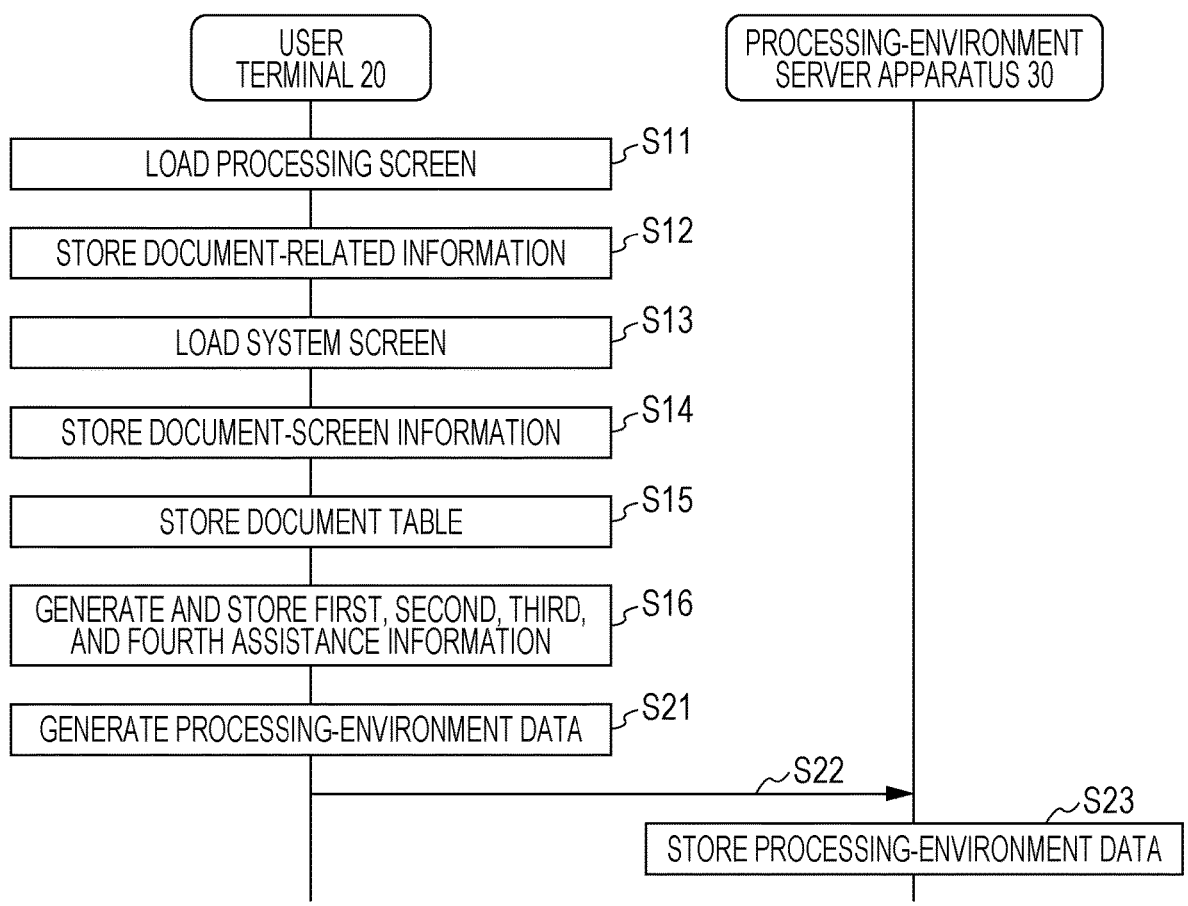
FIG. 14 illustrates an example procedure performed by each apparatus during a process for stopping processing.

FIG. 14 illustrates an example procedure performed by each apparatus during the process for stopping processing. This procedure starts in response to, for example, user's selection of the processing-stoppage icon M11 that indicates the stoppage of processing from the operation menu M1 illustrated in FIG. 11. First, the user terminal apparatus 20 (the assistance-information generating unit 206) loads a processing screen that is being displayed and generates a captured image representing the processing screen (step S11).

Then, the user terminal apparatus 20 (the assistance-information generating unit 206, the processing-environment-related-information storing unit 203) stores document-related information (e.g., the document-related information illustrated in FIG. 7) including display position information indicating the position at which a document is displayed on the loaded processing screen (step S12). Then, the user terminal apparatus 20 (the assistance-information generating unit 206) loads a system screen that is being displayed to generate a captured image representing the system screen (step S13). Then, the user terminal apparatus 20 (the assistance-information generating unit 206, the screen analyzing unit 205, the processing-environment-related-information storing unit 203) stores document-screen information (e.g., the document-screen information illustrated in FIG. 8) including document-portion information on the loaded system screen (step S14).

Then, the user terminal apparatus 20 (the assistance-information generating unit 206, the processing-environment-related-information storing unit 203) stores a document table (e.g., the document table illustrated in FIG. 10) in which the document-related information and the document-screen information are associated with each other (step S15). Then, by using the images and information that are loaded and stored in step S11 through step S15, the user terminal apparatus 20 (the assistance-information generating unit 206, the processing-environment-related-information storing unit 203) generates and stores first, second, third, and fourth assistance information (e.g., each assistance information item illustrated in FIG. 12A and FIG. 12B) (step S16).

Then, the user terminal apparatus 20 (the processing-environment managing unit 202) generates the processing-environment data indicating the processing environment provided at the time of the stoppage of the processing (step S21) and transmits the generated processing-environment data to the processing-environment server apparatus 30 (step S22). The processing-environment server apparatus 30 (the processing-environment-data storing unit 302) stores the transmitted processing-environment data (step S23). The above-described procedure is the procedure during the process for stopping the processing. Note that the set of step S11 and step S12 and the set of step S13 and step S14 may be performed in the reverse order or concurrently with each other. In addition, step S21 through step S23 may be performed before or concurrently with the other steps.

Figure 15:
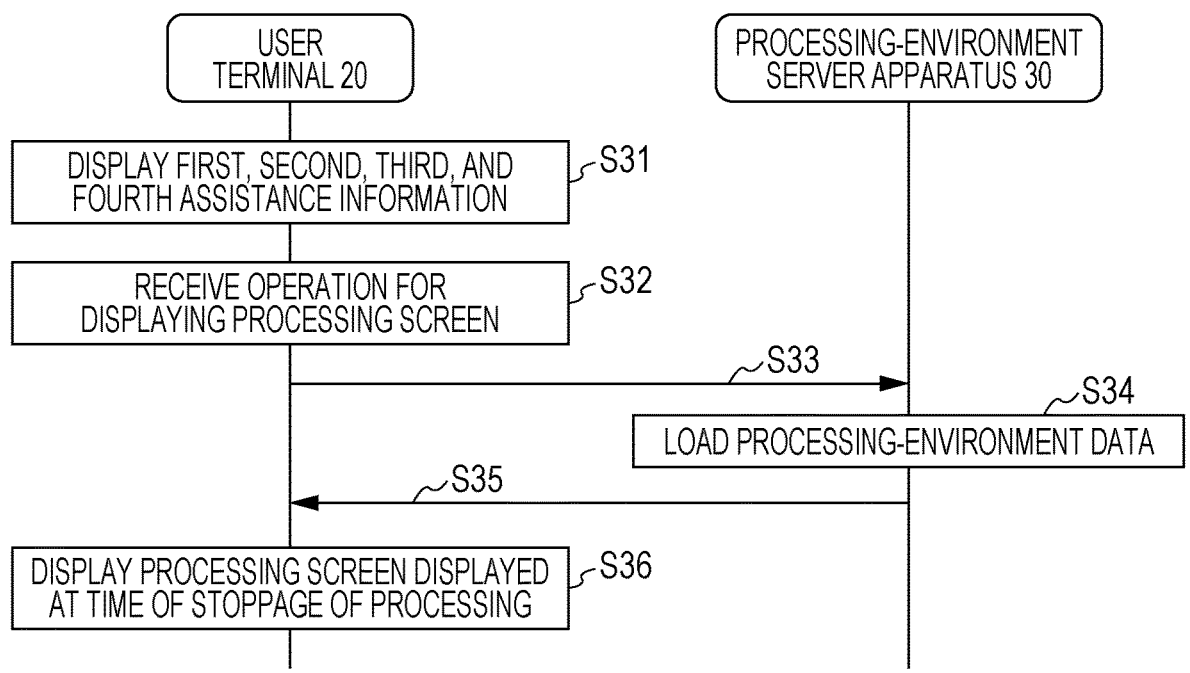
FIG. 15 illustrates an example procedure performed by each apparatus during a process for resuming the processing.

FIG. 15 illustrates an example procedure performed by each apparatus during the process for resuming the processing. This procedure starts in response to, for example, user's selection of the processing-resumption icon M12 that indicates the resumption of the processing from the operation menu M1 illustrated in FIG. 11. First, the user terminal apparatus 20 (the assistance-information generating unit 206, the assistance-information display controlling unit 207) causes the stored first, second, third, and fourth assistance information to be displayed in accordance with a user's operation (step S31). Then, upon receiving an operation for displaying the processing screen (step S32), the user terminal apparatus 20 (the processing-environment managing unit 202) requests the processing-environment server apparatus 30 for the processing-environment data indicating the processing environment provided at the time of the stoppage of the processing (step S33).

The processing-environment server apparatus 30 (the processing-environment-data storing unit 302) loads the processing-environment data requested in step S33 (step S34), and transmits the processing-environment data to the user terminal apparatus 20 from which the request has been transmitted (step S35). On the basis of the transmitted processing-environment data, the user terminal apparatus 20 (the processing-environment managing unit 202, the processing-screen display controlling unit 201) causes the processing screen to be displayed, the processing screen being displayed at the time of the stoppage of the processing to be displayed (step S36).

In the exemplary embodiment, as describe above, by display control performed by the assistance-information display controlling unit 207, each assistance information item, that is, information that assists the resumption of the processing related to the document used in the business system 100, is provided to the user. In addition, in the exemplary embodiment, as in the guidance image D3 and the guidance image D4 illustrated in FIG. 12B, the fourth assistance information indicating the portion corresponding to the document on the system screen is displayed. Accordingly, the processing related to the document on the system screen may start more quickly than in the case where the fourth assistance information is not displayed.

Furthermore, in the exemplary embodiment, as in the captured image C1 illustrated in FIG. 12A, the captured image of the processing screen is displayed as the first assistance information (information indicating the state of the processing screen displayed at the time of the stoppage, the processing screen being used for performing the document-related processing). Accordingly, the user may view the processing screen that is to be displayed when resuming the processing before the actual processing screen is displayed.

In addition, in the exemplary embodiment, as in the display button E1 illustrated in FIG. 12B, an image for displaying the document is displayed. Accordingly, it may be easier to display the document than in the case where such an image is not displayed. Furthermore, in the exemplary embodiment, as in the display button E2 illustrated in FIG. 12C, an image to be displayed, the image being used for receiving an operation for displaying the processing screen displayed at the time of the stoppage of the processing. Accordingly, it may be easier to display the actual processing screen than in the case where such an image is not displayed.

2. Modifications

The above-described exemplary embodiment is merely an example for implementing the present invention, and modifications may be provided as below. In addition, the exemplary embodiment and each modification may be implemented in combination as necessary.

2-1. First Assistance information

The assistance-information generating unit 206 may generate first assistance information different from the first assistance information in the exemplary embodiment. For example, in response to the selection of the processing-stoppage icon M11 illustrated in FIG. 11, the processing-environment-related-information storing unit 203 according to this modification determines that the document-related processing is to be stopped and stores layout information indicating the layout of the elements of the processing screen displayed at the time of the stoppage. The processing-environment-related-information storing unit 203 is an example of a "layout memory" according to an exemplary embodiment of the present invention.

The elements of the processing screen include a frame outside the processing screen, inner frames as partitions inside the processing screen, objects (e.g., folders displayed in the form of a tree, thumbnail images of documents, and processing icons) displayed in each region partitioned by the inner frames, and the like. The layout information refers to information indicating the shapes and sizes of the frames, the positions at which the objects are displayed, the sizes of the objects, and the like.

Once the document-related processing is resumed in response to the selection of the processing-resumption icon M12 illustrated in FIG. 11, on the basis of the layout information stored in the processing-environment-related-information storing unit 203, the assistance-information generating unit 206 generates, for example, as an image representing the processing screen, an image representing each of the elements in the layout used at the time of the stoppage of the processing. An image generated by the assistance-information generating unit 206 on the basis of, for example, the layout information of the processing screen A1 illustrated in FIG. 6 corresponds to the captured image C1 illustrated in FIG. 12A.

The assistance-information generating unit 206 generates the captured image C1 and also generates the guidance image D1 and the guidance image D2 illustrated in FIG. 6 as the first assistance information as in the exemplary embodiment. The assistance-information generating unit 206 supplies the generated first assistance information to the assistance-information display controlling unit 207. The assistance-information display controlling unit 207 causes the captured image C1, the guidance image D1, and the guidance image D2, which have been generated by the assistance-information generating unit 206, to be displayed as the first assistance information. In this case, the image illustrated in FIG. 12A is displayed.

In this modification, the layout information is stored during the stoppage of the processing, and the captured image C1 is generated once the processing is resumed. The layout information is, for example, information represented by text, such as text about the shapes, sizes, and positions, and typically has a smaller data amount than the captured image C1. Accordingly, in this modification, the data amount stored during the stoppage of the processing may be reduced compared with the case where the image representing the processing screen is generated before the processing is resumed.

Note that the image representing the processing screen is not necessarily generated. For example, once the document-related processing is resumed in response to the selection of the above-described processing-resumption icon M12, the assistance-information display controlling unit 207 may read the layout information stored in the processing-environment-related-information storing unit 203 and may cause the processing screen to be displayed as the first assistance information on the basis of the read layout information, the processing screen representing each of the elements in the layout used at the time of the stoppage of the processing.

In this case, the assistance-information display controlling unit 207 may display the guidance image D1 and the guidance image D2 illustrated in FIG. 12A as the first assistance information so as to be superposed on the processing screen. In either case, the resumption of the document-related processing alone results in the displaying of the processing screen displayed at the time of the stoppage of the processing. This may eliminate the necessity for an operation for displaying the actual processing screen, such as the pushing operation of the display button E2 illustrated in FIG. 12C.

2-2. Document-Portion Information

The screen analyzing unit 205 may specify the portion corresponding to a document in a manner different from that in the exemplary embodiment. For example, the user terminal apparatus 20 stores, as a history of the document-related processing, the document-portion information and a document ID of the document (the document as the processing target) corresponding to the portion indicated by the information. On the basis of the stored history of the document-related processing, the screen analyzing unit 205 specifies, as the portion corresponding to the document, the portion in which the document stored in the document storing unit 231 is frequency referred to on the system screen.

2-3. Information Processing Apparatus

The information processing apparatus realizing each of the functions illustrated in FIG. 5 is not limited to the above information processing apparatus. For example, some functions (the processing-environment-data generating unit 301 and the processing-environment-data storing unit 302) of the processing-environment server apparatus may be realized by the user terminal apparatus. In addition, some functions (e.g., the processing-environment managing unit 202, the processing-environment-related-information storing unit 203, and the assistance-information generating unit 206) of the user terminal apparatus may be realized by the processing-environment server apparatus. In this case, the processing-environment server apparatus is an example of the "information processing apparatus" according to an exemplary embodiment of the present invention.

2-4. Category of Invention

The present invention may be construed as, in addition to an information processing apparatus such as a user terminal apparatus or a processing-environment server apparatus, an information processing system including these apparatuses and an information processing system including a group of other apparatuses realizing of the functions illustrated in FIG. 5. In addition, the present invention may be construed as an information processing method for realizing the processes performed by each of the apparatuses or as a program for causing a computer to control each of the apparatuses. This program may be provided in the form of a recording medium, such as an optical disc having the program stored therein, or may be provided by being downloaded in a computer via a communication network, such as the Internet, and being installed to be usable.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a first display controller that controls to display:
   (i) a first screen indicating a document; and
   (ii) a second screen used for performing processing related to the document;
   a closer controller that controls to close the first screen if an operation for closing the first screen is received;
   a second display controller that controls to display:
   (i) document information specifying a target document of the processing; and
   (ii) process information corresponding to the target document, if the first screen is redisplayed after the first screen is closed; and
   a layout memory that stores layout information indicating a layout of elements of the first screen at the time the first screen was closed,
   the first screen representing the elements in the layout used at the time the first screen was closed, based on the stored layout information.

2. The information apparatus according to claim 1, the process information indicates a portion on the second screen.

3. The information processing apparatus according to claim 1, wherein the first display controller causes an image to be displayed, the image being used for receiving an operation for displaying the document specified by the document information.

4. The information processing apparatus according to claim 1, further comprising:
    a generating unit that generates an image representing the first screen that was being displayed at the time the first screen was closed,
    wherein the first display controller causes information including the generated image representing the first screen to be displayed.

5. The information processing apparatus according to claim 4, wherein the first display controller causes an image for receiving an operation for displaying the first screen displayed at the time the first screen was closed.

6. An information processing apparatus comprising:
    a first display controller that controls to display:
        (i) a first screen indicating a document; and
        (ii) a second screen used for performing processing related to the document;
    a closer controller that controls to close the first screen if an operation for closing the first screen is received;
    a second display controller that controls to display:
        (i) document information specifying a target document of the processing; and
        (ii) process information corresponding to the target document, if the first screen is redisplayed after the first screen is closed;
    a generating unit that generates an image representing the first screen that was being displayed at the time the first screen was closed,
    wherein the first display controller causes information including the generated image representing the first screen to be displayed; and
    a layout memory that stores layout information indicating a layout of elements of the first screen at the time the first screen was closed,
    wherein, if the processing is resumed, the generating unit generates, as the image representing the first screen, an image representing the elements in the layout used at the time the first screen was closed, based on the stored layout information.

7. An information processing method comprising:
    controlling to display:
        (i) a first screen indicating a document; and
        (ii) a second screen used for performing processing related to the document;
    controlling to close the first screen if an operation for closing the first screen is received;
    controlling to display:
        (i) document information specifying a target document of the processing; and
        (ii) process information corresponding to the target document, if the first screen is redisplayed after the first screen is closed; and
    storing, in a layout memory, layout information indicating a layout of elements of the first screen at the time the first screen was closed,
    the first screen representing the elements in the layout used at the time the first screen was closed, based on the stored layout information.

8. A non-transitory computer readable medium storing a program causing a computer to execute a process for information processing, the process comprising:
    controlling to display:
        (i) a first screen indicating a document; and
        (ii) a second screen used for performing processing related to the document;
    controlling to close the first screen if an operation for closing the first screen is received;
    controlling to display:
        (i) document information specifying a target document of the processing; and
        (ii) process information corresponding to the target document, if the first screen is redisplayed after the first screen is closed; and
    storing, in a layout memory, layout information indicating a layout of elements of the first screen at the time the first screen was closed,
    the first screen representing the elements in the layout used at the time the first screen was closed, based on the stored layout information.

* * * * *